(12) United States Patent
Nakane et al.

(10) Patent No.: US 6,337,839 B1
(45) Date of Patent: *Jan. 8, 2002

(54) OPTICAL DISK RECORDING MEDIUM AND OPTICAL DISK DRIVE APPARATUS

(75) Inventors: Kazuhiko Nakane; Hiroyuki Ohata; Masato Nagasa; Kenji Gotoh; Yoshinobu Ishida, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/695,297

(22) Filed: Oct. 25, 2000

Related U.S. Application Data

(62) Division of application No. 09/333,273, filed on Jun. 15, 1999, now Pat. No. 6,163,522, which is a division of application No. 08/823,683, filed on Mar. 25, 1997, now Pat. No. 5,936,932.

(30) Foreign Application Priority Data

Mar. 25, 1996 (JP) ............................................... 8-68733

(51) Int. Cl.⁷ ................................................. G11B 7/24
(52) U.S. Cl. ............................... 369/59.25; 369/275.3; 369/124.07
(58) Field of Search ................................ 369/32, 44.26, 369/53.29, 59.25, 59.26, 124.07–124.08, 275.2–275.4; 428/64.1–64.4; 430/320–321, 270.11

(56) References Cited

U.S. PATENT DOCUMENTS

| 5,323,380 A | * | 6/1994 | Oda et al. ................. 369/275.1 |
| 5,452,284 A | * | 9/1995 | Miyagawa et al. .......... 369/124 |
| 5,508,995 A | * | 4/1996 | Moriya et al. ............. 369/275.4 |
| 5,638,354 A | * | 6/1997 | Nakayama et al. ....... 369/275.3 |
| 5,724,338 A | * | 3/1998 | Birukawa et al. ........ 369/275.2 |

(List continued on next page.)

FOREIGN PATENT DOCUMENTS

| EP | 0740291 | * | 10/1996 |
| EP | 0757343 | * | 2/1997 |
| GB | 2307589 | * | 5/1997 |
| GB | 2307770 | * | 6/1997 |
| JP | 64-596632 | * | 3/1989 |
| JP | 4-38633 | * | 2/1992 |
| JP | 6-176404 | * | 6/1994 |
| JP | 6-325368 | * | 11/1994 |
| JP | 7-29185 | * | 1/1995 |
| JP | 7-50014 | * | 2/1995 |
| JP | 7-110944 | * | 4/1995 |
| JP | 7-141701 | * | 6/1995 |
| JP | 8-22621 | * | 1/1996 |
| JP | 9-106579 | * | 4/1997 |
| WO | 96/25736 | * | 8/1996 |

*Primary Examiner*—W. R. Young

(57) ABSTRACT

An optical disk according to the present invention has data recording tracks of lands and grooves. Each of the data recording tracks has a length corresponding to a revolution of the disk and includes a plurality of track sectors. The data recording tracks of lands and grooves are connected alternately to each other so as to form a continuous data recording spiral. Each of the track sectors has a preformatted identification signal part for representing sector address data and has a data recording part for recording data. The identification signal part has the first address data region and the second address region. The first address data region and the second address data region are shifted by the same predetermined distance from the center of a groove track oppositely in the radial direction of the disk. The first address data region is set to represent the address of a groove track sector, and the second address data region is set to represent the address of a land track sector adjacent to the groove track sector.

7 Claims, 13 Drawing Sheets

U.S. PATENT DOCUMENTS

| | | | | |
|---|---|---|---|---|
| 5,754,506 A | * | 5/1998 | Nagasawa et al. | 369/44.26 |
| 5,848,050 A | * | 12/1998 | Nagasawa et al. | 369/275.4 |
| 5,859,820 A | * | 1/1999 | Nagasawa et al. | 369/48 |
| 5,867,474 A | * | 2/1999 | Nagasawa et al. | 369/275.3 |
| 5,889,757 A | * | 3/1999 | Mori et al. | 369/282 |
| 5,892,740 A | * | 4/1999 | Nagasawa et al. | 369/44.26 |
| 5,933,410 A | * | 8/1999 | Nakane et al. | |
| 5,936,933 A | * | 8/1999 | Miyamoto et al. | 369/275.3 |
| 5,946,285 A | * | 8/1999 | Nakane et al. | 369/275.3 |
| 5,982,738 A | * | 11/1999 | Miyamoto et al. | 369/275.3 |
| 6,055,218 A | * | 4/2000 | Takeda et al. | 369/44.28 |
| 6,058,099 A | * | 5/2000 | Senshu | 369/275.3 |
| 6,064,643 A | * | 5/2000 | Tanoue et al. | 369/275.3 |
| 6,069,869 A | * | 5/2000 | Nagasawa et al. | 369/275.3 |

* cited by examiner

OPTICAL DISK RECORDING MEDIUM AND OPTICAL DISK DRIVE APPARATUS

This application is a divisional of application Ser. No. 09/333,273, filed on Jun. 15, 1999, now U.S. Pat. No. 6,163,522, which is a divisional of prior application Ser. No. 08/823,683 filed on Mar. 25, 1997, the entire contents of which are hereby incorporated by reference now U.S. Pat. No. 5,936,932.

BACKGROUND OF THE INVENTION

The present invention relates to an optical disk and an optical disk drive apparatus. More specifically, the invention relates to an optical disk for recording data both onto the recording tracks in depressed portions formed by guide grooves and onto the recording tracks in protruding portions between the guide grooves, and an optical disk drive apparatus which uses the optical disk according to the present invention. In recent years, in order to enhance a recording density of a large-capacity rewritable optical disk, a data recording method of recording data both onto guide grooves and onto lands therebetween has been studied. This method is generally referred to as a land-groove recording method. When this recording method is used, a higher recording density can be obtained. This is because the track pitch can be reduced by half compared to the case where only groove tracks are used for data recording. Now, a conventional optical disk drive apparatus which uses the land-groove recording method is described. FIG. 9 is a block diagram showing a structure of an optical disk drive apparatus which is described in Japanese Unexamined Patent Publication 6-176404. Referring to FIG. 9, the optical disk drive apparatus is shown schematically for use with an optical disk 100. The optical disk drive apparatus includes a semiconductor laser 101 for emitting a laser beam. A collimator lens 102 converts the laser beam from the semiconductor laser 101 into a parallel beam. A half mirror 103 receives the beam and directs it toward an objective lens 104, which focuses the beam onto the optical disk 100. A photodetector 105 receives the reflected beam from the optical disk 100. The photodetector 105 includes two light-receiving parts divided by a boundary line parallel to the tracks of the optical disk 100 so as to obtain a tracking error signal. The optical disk drive apparatus further includes an actuator 106 for driving the objective lens 104, an optical head 107 enclosed by a dotted line and mounted on a head base, and a differential amplifier 108 for receiving a detection signal from the photodetector 105. A tracking polarity reversal circuit 109 receives the tracking error signal from the differential amplifier 108 and does or does not reverse the polarity of the tracking error signal, in response to a control signal T1 from a system controller 121. When the tracking error signal is supplied from the differential amplifier 108 to the tracking controller 110 without having its polarity reversed, the beam spot is pulled into a groove track. The tracking controller 110 receives an output signal from the tracking polarity reversal circuit 109 and a control signal T2 from the system controller 121 and supplies tracking control signals to a driving circuit 120 and a traverse motor controller 116.

A summing amplifier 111 receives detection signals from the photodetector 105 and supplies the sum of the signals. A waveform shaping circuit 112 receives a high-frequency component of the sum of the signals from the summing amplifier 111 and supplies digital signals to a reproduced signal processor 113 and an address reproduction circuit 114 respectively. The reproduced signal processor 113 supplies reproduced data to an output terminal. The address reproduction circuit 114 receives the digital signal from the waveform shaping circuit 112 and supplies an address signal to an address calculator 115. The address calculator 115 receives the address signal from the address reproduction circuit 114 and the control signal T1 from the system controller 121 and supplies the correct address signal to the system controller 121. The traverse motor controller 116 provides a driving current to a traverse motor 117 in response to a control signal T3 from the system controller 121. The traverse motor 117 moves the optical head 107 in the radial direction of the optical disk 100. A recording signal processor 118 receives recording data and supplies a recording signal to a laser diode (LD) driving circuit 119. The LD driving circuit 119 receives a control signal T4 from the system controller 121 and the recording signal from the recording signal processor 118 and supplies a driving current to the semiconductor laser 101. The driving circuit 120 supplies a driving current to the actuator 106. The system controller 121 supplies the control signal T1 to the address calculator 115 and the tracking polarity reversal circuit 109, the control signal T2 to the tracking controller 110, the control signal T3 to the traverse motor controller 116, and the control signal T4 to the recording signal processor 118 and the LD driving circuit 119.

The operation of the conventional optical disk drive apparatus having the above-mentioned structure is described with reference to FIG. 9. The laser beam emitted from the semiconductor laser 101 is made to be parallel by the collimator lens 102, passed through the half mirror 103 which is used as a beam splitter, and focused onto the optical disk 100 by the objective lens 104. The beam reflected from the optical disk 100 contains data on data recording tracks. The reflected beam is passed through the objective lens 104 and directed to the photodetector 105 by the half mirror 103. The photodetector 105 detects the strength and distribution of light in the incoming beam, converts it to electrical signals, and supplies them to the differential amplifier 108 and the summing amplifier 111. The differential amplifier 108 applies a current-to-voltage conversion to the input currents, and in response to a potential difference between the input terminals thereof, produces a push-pull signal representing the difference between the two input signals. In response to the control signal T1 from the system controller 121, the tracking polarity reversal circuit 109 determines whether a track being accessed by the optical head is a land track or a groove track and reverses a tracking polarity only when the track being accessed by the optical head is a land track, for example. The tracking controller 110 supplies a tracking control signal to the driving circuit 120 according to the level of the tracking error signal received. In response to the tracking control signal, the driving circuit 120 supplies a driving current to the actuator 106 and controls the position of the objective lens 104 perpendicularly to the direction of the data recording tracks. The beam spot thereby scans the data recording tracks accurately.

The summing amplifier 111 receives output currents from the photodetector 105, applies a current-to-voltage conversion to them, and supplies the sum of the input signals to the waveform shaping circuit 112. The waveform shaping circuit 112 binarizes a data signal and an address signal in analog waveform in accordance with a predetermined threshold value and supplies the digital data signal and the digital address signal to the reproduced signal processor 113 and the address reproduction circuit 114, respectively. The reproduced signal processor 113 demodulates the input digital data signal, applies an error correction to the demodulated digital data, and supplies resultant data as reproduced data.

The address reproduction circuit 114 demodulates the input digital address signal and supplies disk position data to the address calculator 115. The address calculator 115 calculates the address of a sector being accessed by the optical head based on the address read from the optical disk 100 and the control signal T1 from the system controller 121 indicating whether a track being accessed is a land track or a groove track. The manner of address calculation will be described later. Based on the address signal, the system controller 121 determines whether the light beam is scanning a desired sector.

In response to the control signal T3 from the system controller 121, the traverse motor controller 116 supplies a driving current to the traverse motor 117 so as to move the optical head 107 to a target track. At the same time, the tracking controller 110 temporarily stops a tracking servo, in response to the control signal T2 from the system controller 121.

During normal data reproduction, the traverse motor 117 is driven in response to the tracking error signal from the tracking controller 110 so as to move the optical head 108 gradually in the radial direction of the disk with the progress of data reproduction.

The recording signal processor 118 adds error correction codes to the recording data which have been supplied at the time of data recording, modulates the recording data, and supplies an encoded and modulated recording signal to the LD driving circuit 119. When the system controller 121 has set the mode of the LD driving circuit 119 to the data recording mode by means of the control signal T4 supplied therefrom, the LD driving circuit 119 modulates a driving current to be applied to the semiconductor laser 101 based on the input encoded and modulated recording signal. The intensity of a beam spot formed on the optical disk 100 is thereby changed according to the recording signal, and recording marks are formed on the optical disk.

During data reproduction, the mode of the LD driving circuit 119 is set to the data reproducing mode by means of the control signal T4, and the LD driving circuit 119 controls the driving current in such a manner that the semiconductor laser 101 emits a laser beam of a constant intensity. The recording marks and prepits on the data recording tracks of the optical disk 100 can be thereby detected.

A single spiral land/groove format is now described. A conventional optical disk, in which the land-groove recording method is used, has a continuous spiral of groove tracks, and land tracks are also in a separate continuous spiral form.

FIG. 10 is a diagram showing another conventional optical disk having a format in which land tracks L and groove tracks G are connected alternately so as to form a single spiral of data recording tracks. An optical disk having such a format, hereinafter referred to as a single spiral land/groove format (SS-L/G format), is disclosed in Japanese Unexamined Patent Publication 4-38633.

When a tracking servo is applied to an SS-L/G format optical disk, it is necessary that connecting points CP which connect a groove track G and a land track L be detected correctly, and a tracking servo polarity be switched to control a tracking servo system so as to track on a groove track or on a land track.

A description is now directed to the methods of inserting identification signal prepits on an optical disk for producing identification signals for which the land-groove recording is performed and which is used by an optical disk drive apparatus. The three methods of inserting identification signal prepits, as shown in FIG. 11A through FIG. 11C, are known. In these figures, HF denotes header parts and DRF denotes data parts. In the method shown in FIG. 11A, land track sectors and groove track sectors have their own sector addresses, respectively. If the width of prepits representing an identification signal were set to be identical to the width of a groove, the prepits between the adjacent tracks would be connected to each other, and the identification signal could not be detected correctly. For this reason, the width of the prepits is set to be smaller than that of a groove, and normally is set to be around a half of the width of a groove. For inserting prepits having a width different from that of a groove continuously during the mastering process of mother stamper in disk fabrication, the diameter of a laser beam for forming the prepits must be different from that for forming the groove. This means two separate laser beams must be used for forming grooves and prepits. If the laser beams are not aligned in-line during the formation of grooves and prepits, a tracking offset will occur between the reproduction of identification signals from the prepits and the recording/reproduction of data recording signals. The quality of the reproduced data will therefore deteriorate. More specifically, due to the deviation of tracking, the error rate of the reproduced data will increase, leading to lower reliability of the reproduced data. For this reason, highly accurate positioning of the two laser beams is required during the formation of prepits and grooves, which will be a factor raising the cost of disk fabrication.

In view of the above-mentioned problem, and in terms of the accuracy and the cost of the fabrication of an optical disk, it is preferable that identification signal prepits should be formed in accordance with the method shown in FIG. 11B or FIG. 11C, where grooves and prepits can be formed by means of a single laser beam. FIG. 11B and FIG. 11C respectively show different methods of inserting prepits having substantially the same width as the width of the grooves. FIG. 11B shows a conventional optical disk described in Japanese Unexamined Patent Publication 6-176404. The optical disk in FIG. 11B uses a method of inserting prepits which is also referred to as a land/groove common address method. In this method, identification signal prepits are disposed around the center of a pair of adjacent groove and land tracks, and the same identification signal prepits are shared by the sectors in the groove and land tracks.

FIG. 11C shows another L/G individual address method. In this method, individual addresses are provided for land and groove track sectors, respectively. The positions of the identification signal prepits for the land and groove track sectors adjacent to each other are shifted relative to each other in a direction parallel to the tracks such that they do not overlap each other in the radial direction. Japanese Unexamined Patent Publication 7-110944 discloses an example of this method. When the above-mentioned conventional method of providing sector addresses is applied to an SS-L/G format optical disk illustrated in FIG. 10, the following problems will occur. Let us assume, for example, that, in the aforementioned method described in Japanese Unexamined Patent Publication 6-176404 and shown in FIG. 11B, the position of prepits is shifted by a predetermined distance, such as half a track pitch (a full track pitch being defined as the distance between the centers of the land and groove tracks adjacent to each other), from the center of a groove track. In the SS-L/G format optical disk, land and groove tracks are connected in every revolution. FIG. 12 shows arrangements of land and groove tracks immediately before and after a connecting point CP. Identification signal prepits for a groove track sector are formed in the leading end thereof, and are shifted by half a track pitch, in the radially outward direction OP from the center of the groove track. These prepits are at a position half a track pitch radially inward (IP) from the center of a land track sector adjacent to and radially outside of the above-mentioned groove track. When a beam spot scans along a groove track, a radially outer half of the reflected beam is modulated by the preformatted identification signal, and the identification signal for the groove track sector is thus detected. When the beam spot scans along a land track, a radially inward half of the reflected beam is modulated by the preformatted identification signal, and the identification signal for the land track sector is thus detected. This means that the same identification signal is produced for the groove track sector and for the land track sector which is adjacent to and outside of the above-mentioned groove track sector. The system controller 121 knows whether the beam spot is scanning a groove track sector or a land track sector, that is, it recognizes the tracking polarity. The track sector address can therefore be identified by the address calculator 115, according to the address data obtained from the address signal from the address reproduction circuit 114 and the control signal T2 from the system controller 121. As shown in FIG. 12, the address of a groove track sector immediately after a connecting point CP is set to #n. Now, let us assume that the number of sectors in one recording track is N. Then, the address of the groove track sector immediately before the connecting point CP after one revolution of the track will be #(n+N−1). This sector is connected to a land track sector at the connecting point. This land track sector immediately after the connecting point adjacent to and outside of the above-mentioned groove track sector has the address which is common to the groove track sector. Thus, the address of the sector becomes #n again.

Similarly, the address of the land track sector immediately before the connecting point after a further revolution of the track will be #(n+N−1). This land track sector is connected to the groove track sector having the sector address #(n+N). As described above, the N groove track sectors and the N land track sectors alternate to form a continuous spiral of data recording tracks. FIG. 13 shows a change in a sector address in this data recording spiral. In a conventional optical disk such as a compact disc or a magneto-optical disk, either a land or a groove is used as a data recording track. Generally, the data recording tracks on the optical disk form a data recording spiral, and sequential addresses are assigned to the sectors arranged in the data recording spiral. Thus, since the relationship between a sector and an address number thereof is very simple, the optical head can easily access a target sector. On the contrary, if the conventional addressing scheme is applied to an SS-L/G format optical disk, the sector address value will not change monotonously with the sector position in the data recording spiral, as shown in FIG. 13. The physical position of a sector in the data recording track spiral cannot be identified until the readout address of the sector is converted to the address value representing the arrangement sequence of the sector in the data recording spiral in consideration of the tracking polarity of the sector recognized by the optical disk drive apparatus. Whenever the optical head of the optical disk drive apparatus is going to access a specific sector in the optical disk, the above-mentioned address calculation is required. Especially, whenever the optical head makes a series of non-sequential access to sectors, such complex address calculation is required. This imposes a considerably heavy burden on the optical disk drive apparatus. The above-mentioned problem is further manifested in the case of a format used in a high-density optical disk. In a ZCAV (Zoned Constant Angular Velocity) format or a ZCLV (Zoned Constant Linear Velocity) format, in which the recording area of an optical disk is divided into a plurality of annular zones and a more outward zone of the disk has a greater number of data recording sectors per data recording track, the number of sectors per track indicated by N as shown in FIG. 12 or FIG. 13 changes with the radial position of a track in the optical disk. For this reason, the above-mentioned address calculation for determining the physical position of a sector in a data recording spiral based on both the address of the sector and the tracking polarity will become further complex.

In the case of the L/G independent address method as shown in FIG. 11C, nothing is disclosed in Japanese Unexamined Patent Publication 7-110944 about how the addresses are assigned to the sectors. A method can however be conceived in which separate sequences of addresses are assigned to the sectors in the groove track spiral and sectors in the land track spiral. The relationship between the position of a sector in data recording spirals and the address of the sector is the same as that illustrated in FIG. 13, like the case where identification signal prepits are formed in accordance with the land/groove common address method illustrated in FIG. 11B. In this case, however, it is not necessary to discriminate between a land track sector and a groove track sector, based on the tracking polarity recognized by the optical disk drive apparatus, unlike the case where the land/groove common address method is used. This is because discrimination between a land track sector and a groove track sector can be made according to a reproduced identification signal. However, the address calculation for determining the position of a sector in a data recording spiral is still complex.

Now, a description will be directed to the problems about the servo system. In an SS-L/G format optical disk, both lands and grooves are used for data recording. Thus, a higher track density can be obtained. However, because of this higher track density, when a tracking offset is increased, the quality of a reproduced signal is lowered because of crosstalk from an adjacent track and the error rate increases due to an increase in jitter. Crosserase problem of data on an adjacent track may also occur during data recording. A tracking error signal which will cause a tracking offset is generated due to combined effects of the optical head system, the arrangement of tracks in an optical disk, and the servo system. Accordingly, the detected error signal level is different between a land track and a groove track, in general. In order to eliminate crosstalk and crosserase, different offset compensations are required between a land track and a groove track. In a conventional optical disk having a groove track spiral and a land track spiral, a track offset compensation can be made separately for each of the data recording track spirals during the continuous tracking operation a little by little, taking a certain time period until an optimum amount of tracking compensation is found. After the adjustment, the amount of compensation can be retained. Thus, a track offset compensation can be made easily. On the other hand, in the case of an SS-L/G format optical disk, a tracking polarity is reversed every revolution. The tracking offset compensation should therefore be made quickly. In connection with the method of inserting identification signals in FIGS. 11A, 11B, and 11C, adequate consideration has not been given to the above-mentioned track offset compensation. In the case of the land/groove common address method illustrated in FIG. 11B, for example, throughout the period in which an identification signal is scanned, the identification signal prepits are only on one side of the beam spot, so that the tracking offset keeps on increasing. On the other hand, in the case of the L/G independent address method illustrated in FIG. 11C, detection of a tracking offset is difficult, like the case of the land/groove common address method illustrated in FIG. 11B. As has been described, when any of the above-mentioned three methods of inserting identification signal prepits is applied to the SS-L/G format optical disk, the sector address calculation will become complex. Further, in the SS-L/G format optical disk, tracking offset compensation should be made quickly, but detection of a tracking offset is difficult. Still further, in the SS-L/G format optical disk, a connecting point between land tracks and groove tracks should be detected easily.

SUMMARY OF THE INVENTION

The present invention has been made to solve the above-mentioned problems. It is therefore an object of the present invention to provide an SS-L/G format optical disk on which all sector addresses are arranged sequentially along a single data recording spiral. It is another object of the present invention to provide an SS-L/G format optical disk for which a tracking offset compensation can be made quickly and accurately. It is still another object of the present invention to provide an SS-L/G format optical disk for which connecting points between land tracks and groove tracks can be detected easily. It is a further object of the present invention to provide an optical disk drive apparatus capable of driving the optical disks achieving the above-mentioned objectives.

According to one aspect of the invention, there is provided an optical disk having data recording tracks of lands and grooves, each of the data recording tracks having a length corresponding to a revolution of the disk comprising a plurality of track sectors, each of the plurality of track sectors (RS) having a preformatted identification signal part (IDF) for representing sector address data and having a data recording part (DRF) for recording data by a localized optical constant variation or a change in a physical shape applied thereto by using a laser beam, the data recording tracks of lands and grooves being connected alternately to each other so as to form a continuous data recording spiral; wherein a first address data region (FR) of the identification signal part for representing first address data is shifted by a predetermined distance from the center of a groove track in one radial direction of the disk, a second address data region (RR) of the identification signal part for representing second address data is shifted by the same predetermined distance from the center of the groove track in the other radial direction of the disk, and the first address data represents the address of a land track sector and the second address data represents the address of a groove track sector adjacent to the land track sector.

With the above configuration, a one-to-one relationship can be established between a sector and its address, regardless of whether the address value obtained from the identification signal is for a sector in a groove track or a land track. Thus, the addresses of the sectors can be determined unequivocally, without distinction between groove and land tracks. Further, by providing the identification signal part the first address data region and the second address data region which are shifted oppositely from the center of a groove track by a predetermined distance in the radial direction of the disk, detection of a tracking error and a correction of a tracking offset can be performed easily and accurately.

The address of the groove track sector may be recorded in multiple in the first address data region of the identification signal part, and the address of the land sector may be recorded in multiple in the second address data region of the identification signal part.

With above configuration, a reading error rate of the address data in the identification signal can be reduced, and the reliability of address data reading can be enhanced. Further, by recording a plurality of the first address data and the second address data onto the identification signal part of a sector, a tracking error can be detected over an extended time period, and a tracking accuracy can be enhanced. The tracking offset correction by the servo system thus can be implemented more easily and accurately.

It may be so arranged that a plurality and the same number of the first address data and the second address data are alternately recorded onto the identification signal part of a track sector.

With the above configuration, a reading error rate of the address data in the identification signal can be reduced, and the reliability of address data reading can be enhanced. At the same time, since a groove track sector address and a land track sector address are recorded alternately in multiple locations, the reliability of address data is enhanced. Further, by recording a plurality of the first address data and the second address data onto the identification signal part of a sector, a tracking error can be detected over an extended time period, and a tracking accuracy can be enhanced. The tracking control by the servo system thus can be implemented more easily and accurately.

The address of a track sector may be set to increase or decrease monotonously with the order of arrangement of the track sector along the continuous data recording spiral, without distinction between land and groove tracks.

With the above configuration, the sector address calculation is substantially simplified, and the control programs for the optical disk drive apparatus and the structure of the access control circuit can be simplified.

The disk may be divided into annular zones, and a difference between the addresses of track sectors which are adjacent to each other in a radial direction of the disk may be set to J, and J may be identical to or greater than the number of track sectors constituting a data recording track in the outermost zone of the disk.

With the above configurations, even if reading of the address data of a sector fails, the address of the sector adjacent thereto can be referred to and the address data of the sector can be obtained. Further, by reading both of the addresses for adjacent sectors constantly, the redundancy of the address information can be increased, and the reliability of address data reading can be enhanced. If this address setting method is applied to an optical disk having the ZCAV format or the ZCLV format, the address management of the sectors immediately before and after the connecting point between land tracks and groove tracks can be simplified.

According to another aspect of the invention, there is provided an optical disk drive apparatus for driving the optical disk according to the above configurations, comprising:

an address extracting circuit (1) for extracting an address of a track sector by selecting between an address recorded in a first address data region and an address recorded in a second address data region of an identification signal part of the track sector on the optical disk, and an address reproduction circuit (114) using the value of the extracted address as the physical address of the track sector, without distinction between land and groove tracks.

With the above configuration, the address management of land track sectors and groove track sectors and the address management of track sectors immediately before and after the connecting point between land tracks and groove tracks can be simplified. The circuit for reading address data of the identification signals can be simplified, thus reducing the cost of the manufacture of the apparatus. Moreover, a reading error rate of the address data in an identification signal can be reduced, and the reliability of address data reading can be enhanced. In addition, the tracking error detection and correction can be implemented easily and accurately. Furthermore, by implementing an accurate tracking control, the reliability of readout address data can be improved.

BRIEF DESCRIPTION OF THE DRAWINGS

These objects and features of the present invention will best be understood from a detailed description of preferred embodiments thereof, selected for purposes of illustration and shown in the accompanying drawings in which.

DETAILED DESCRIPTION OF PREFERRED EMBODIMENTS

Now, the embodiments of the present invention will be described with reference of the appended drawings.

First Embodiment

Figure 1:
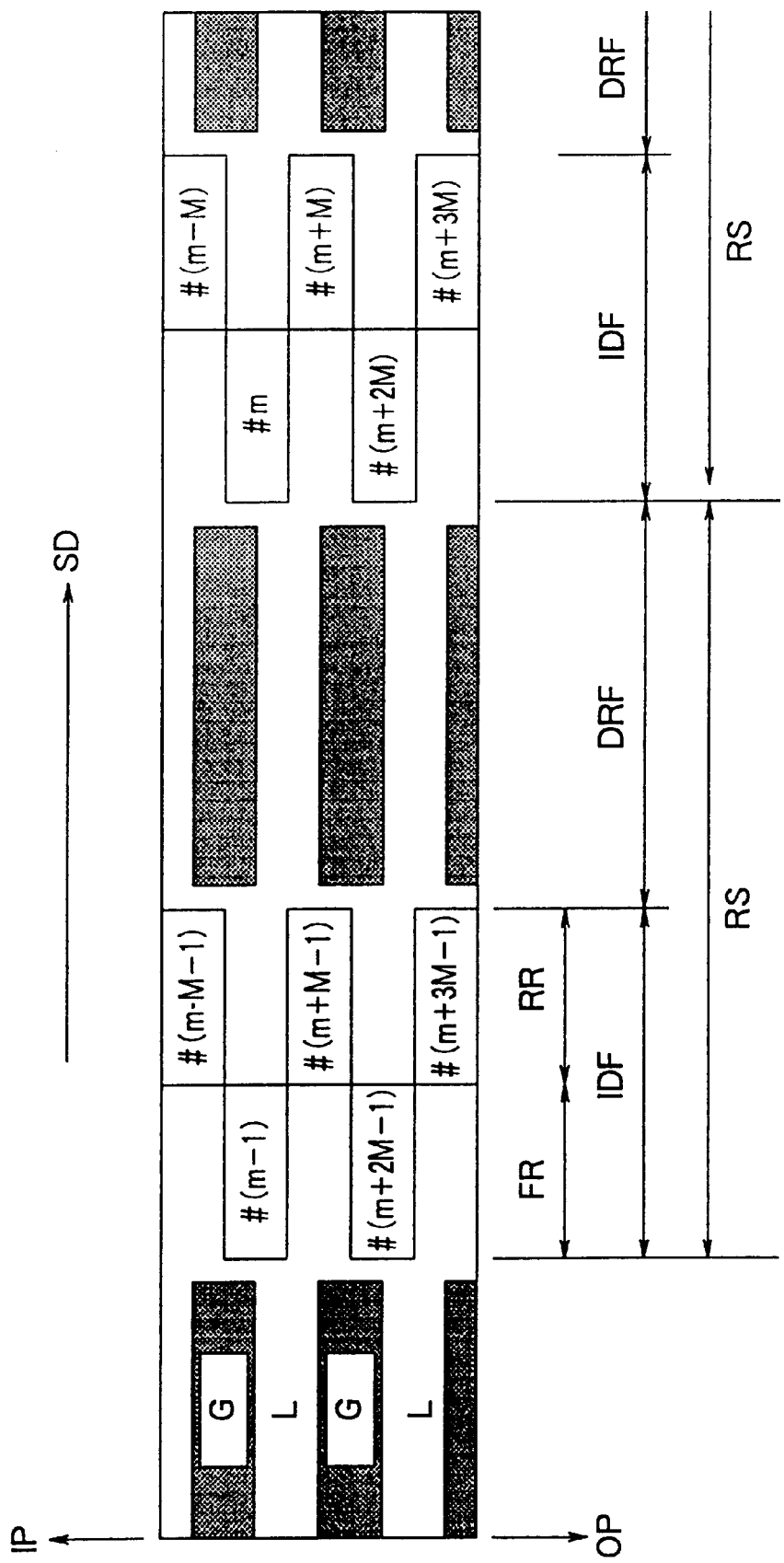
FIG. 1 schematically shows the arrangement of identification signal prepits in data recording sectors on an optical disk according to the first embodiment of the present invention and the address values of the data recording sectors.

Optical disks described in the following embodiments are of the SS-L/G format. First, the physical layout of track sectors is shown. FIG. 1 schematically shows the arrangement of identification signal prepits in data recording sectors on an optical disk and the address values of the data recording sectors according to the first embodiment of the present invention. In the SS-L/G format optical disk, data is recorded both onto land tracks and groove tracks. The land tracks and the groove tracks are connected alternately with each other so as to form a single data recording spiral. A data recording sector RS consists of an identification signal part IDF having prepits and a data recording part DRF capable of recording user data and various control data. The identification signal part IDF consists of a front region FR and a rear region RR positioned in the stated order in the scanning direction of a laser beam spot. The front region FR (or the identification signal prepits formed therein) of the identification signal part IDF is shifted by half the track pitch outwards (OP) in the radial direction of a disk. On the other hand, the rear region RR is shifted by half the track pitch inwards in the radial direction of the disk.

Now, the method of assigning the address values to the front regions FR and the rear regions RR of the identification signal part IDF is described. The address of a groove track sector is represented by an identification signal in the front region FR which is shifted radially outwards. On the other hand, the address of a land track sector is represented by an identification signal in the rear region RR which is shifted radially inwards. During the mastering process of mother stamper in disk fabrication, the groove tracks and the identification signal prepits are cut by the beam spot simultaneously. That is, after a groove of each sector is cut, and before a groove of the next sector is cut, the beam spot is shifted in one direction (radially outwards) and then in the other direction (radially inwards) to form the identification signal prepits shown in FIG. 1. This method is advantageous as it is associated with a smaller tracking offset during fabrication of the mother stamper. As an alternative, the prepits for groove track sectors may be cut during the cutting of groove tracks, and the prepits for the land track sectors may be cut during the cutting of land tracks (tracing of land tracks with the laser being turned off), if such a method results in a smaller tracking offset characteristic. When the address of a data recording sector (a groove track sector in the case of FIG. 1) is set to #m (m is an integer) and when the number of sectors constituting one data recording track is set to M (M is also an integer) as shown in FIG. 1, the address after one revolution of the track is #(m+M). The address of a sector after a further revolution of the track is #(m+2M). The address of a sector after a further revolution of the track is #(m+3M). As described above, though the physical configurations of the sectors alternate between land track sectors and groove track sectors, the address values will change linearly.

Figure 2:
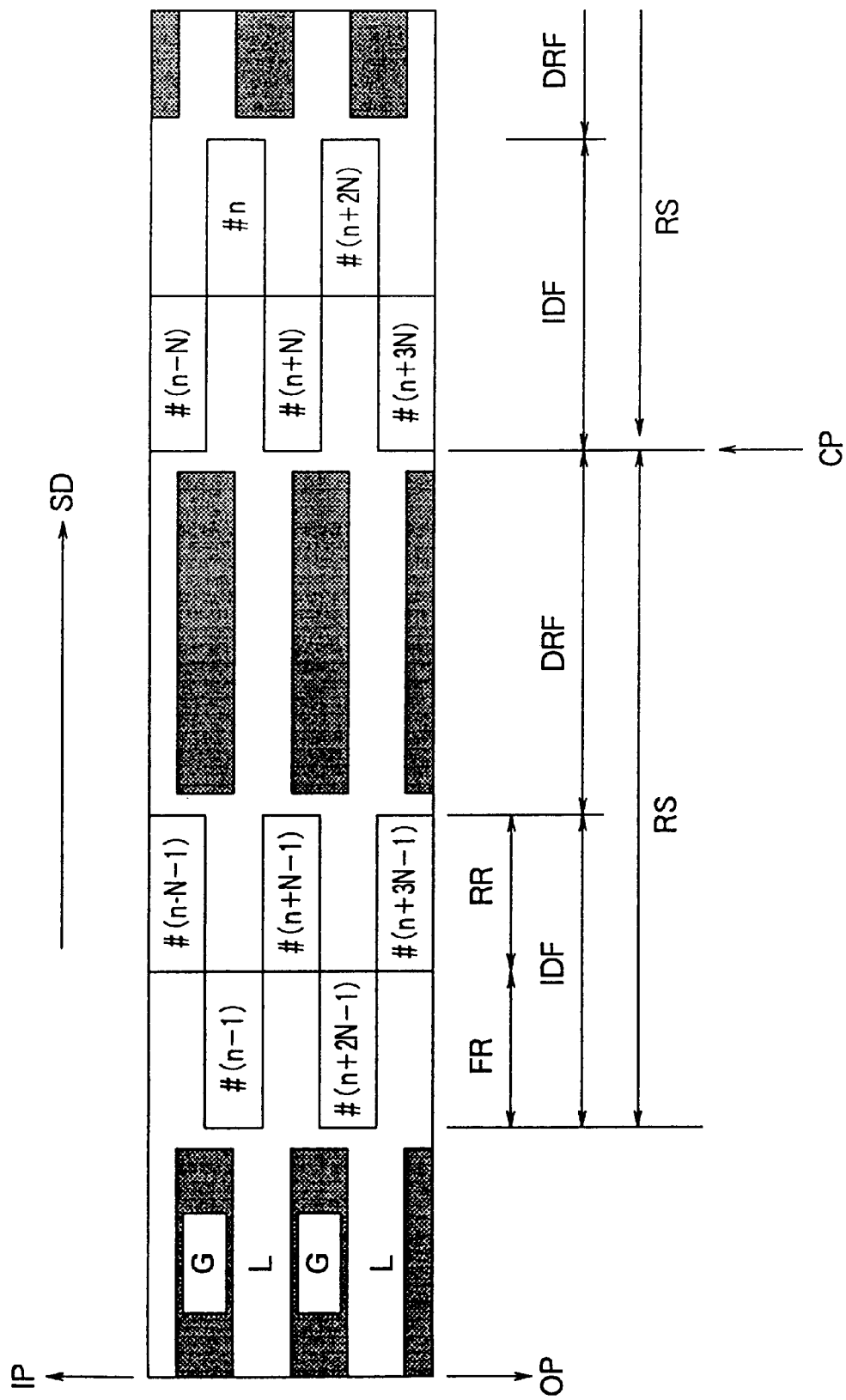
FIG. 2 schematically shows the arrangement of identification signal prepits in data recording sectors and the corresponding address values of the sectors immediately before and after a boundary line between the land tracks and the groove tracks of an optical disk according to the first embodiment of the present invention.

FIG. 2 schematically shows the arrangement of identification signal prepits and the address values of the data recording sectors immediately before and after a connecting point CP. The arrangement of identification signal prepits at a connecting point is the same as that in other track sectors.

Figure 3:
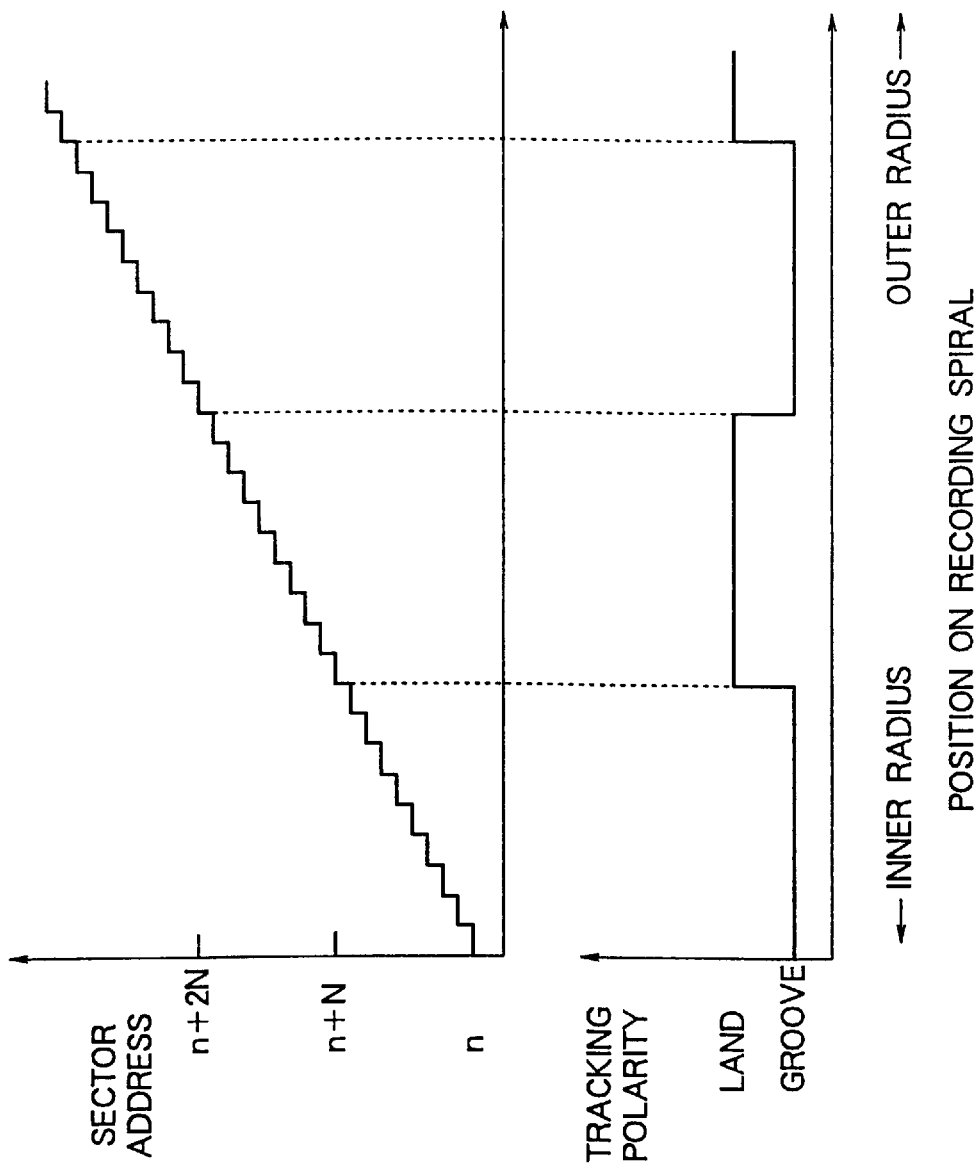
FIG. 3 shows the relationship between the position of the track sectors in the data recording spiral of an optical disk according to the first embodiment of the present invention and the addresses of the track sectors.
Figure 4:
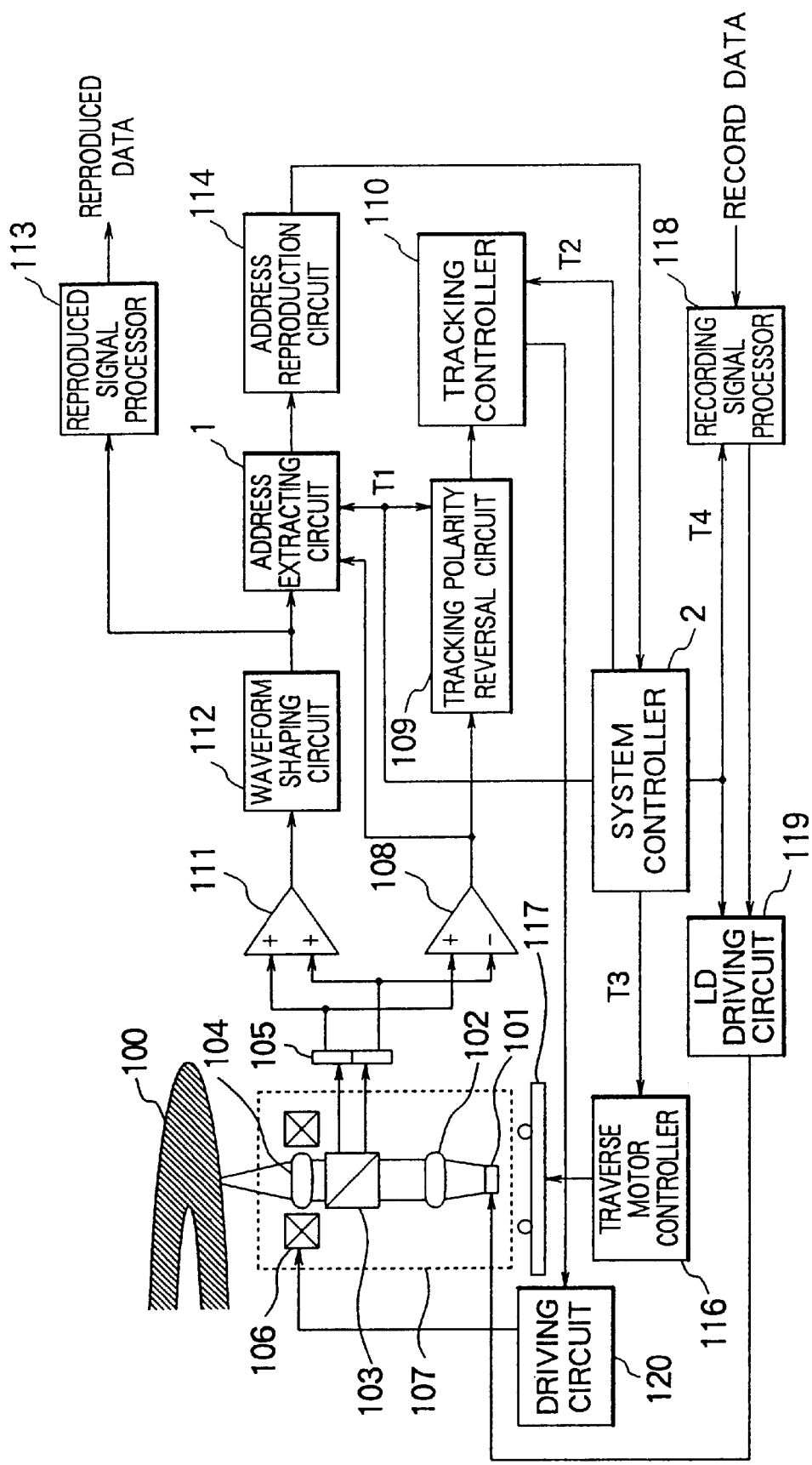
FIG. 4 is a block diagram showing a structure of an optical disk drive apparatus according to the first embodiment of the present invention.
Figure 9:
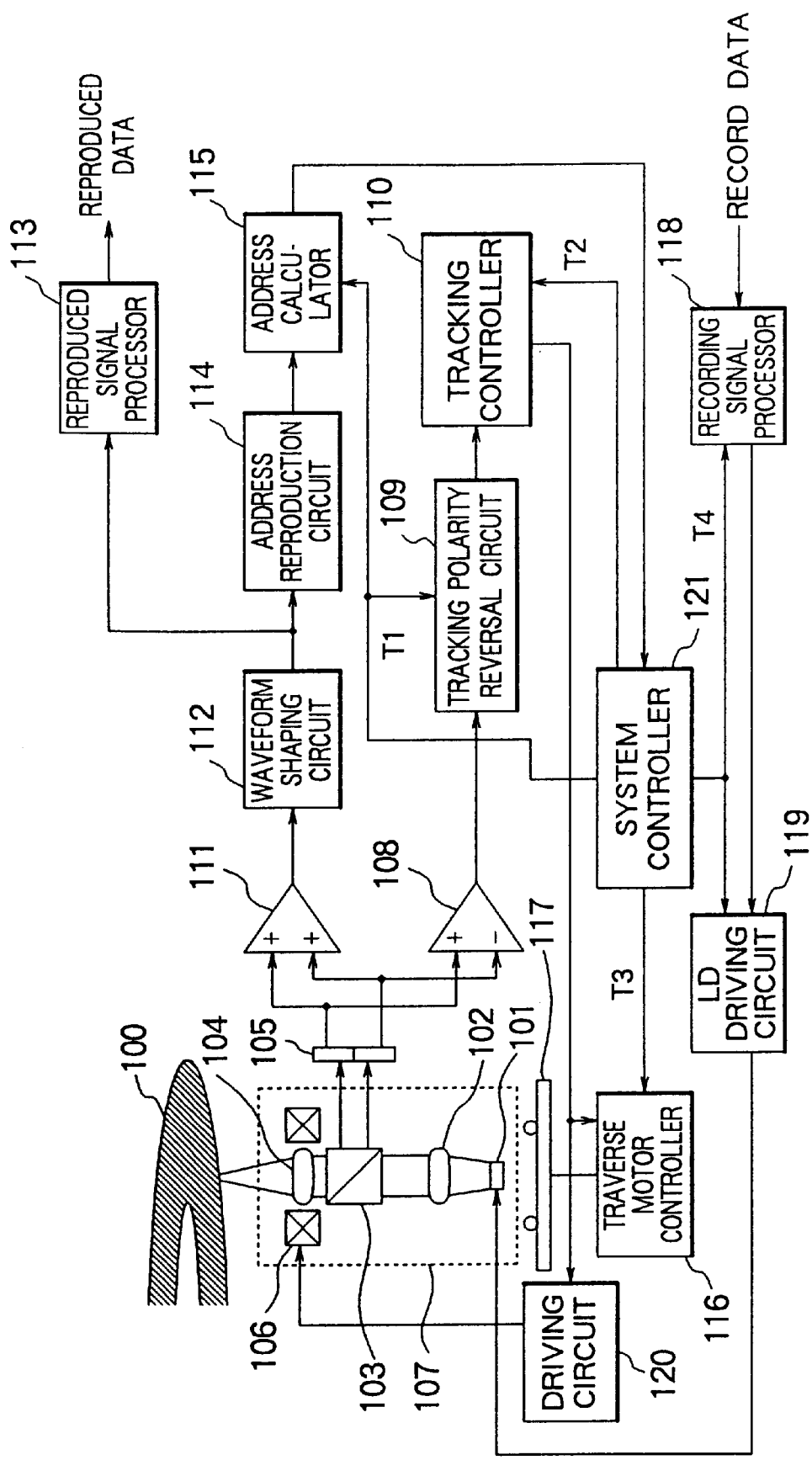
FIG. 9 is a block diagram showing a structure of a conventional optical disk drive apparatus.
Figure 10:
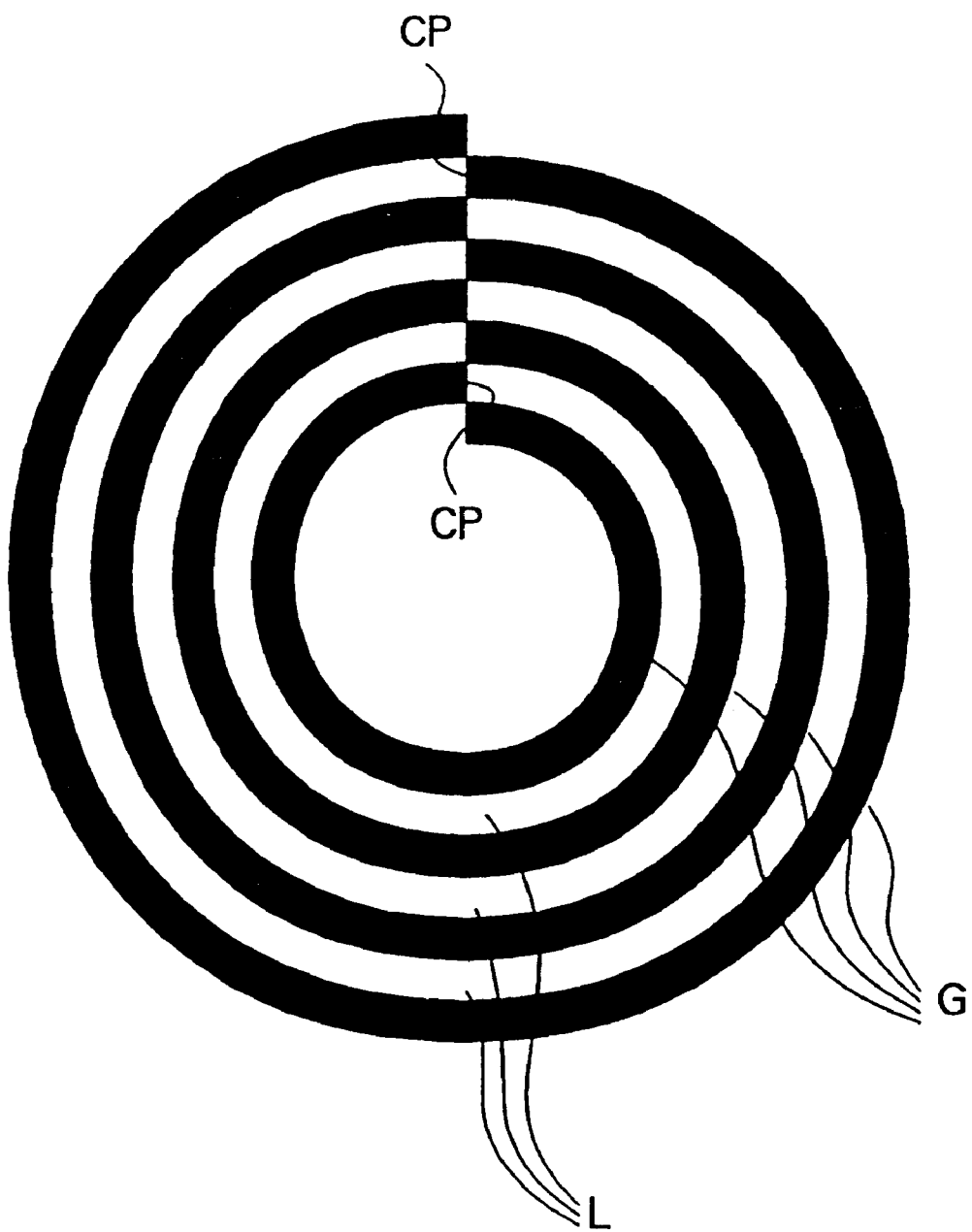
FIG. 10 is a diagram showing an optical disk in which groove tracks and land tracks are connected alternately to form a single data recording spiral.
Figure 11A:
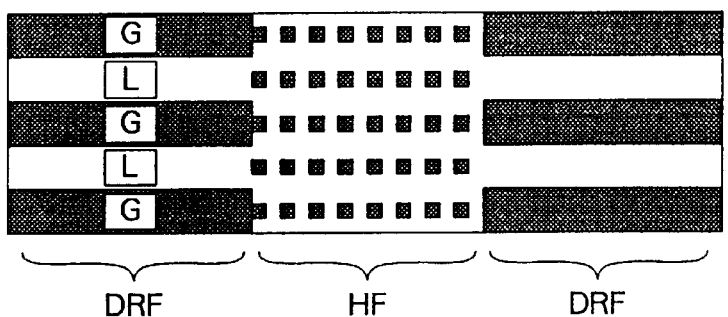
FIGS. 11A through 11C show methods of forming identification signal prepits on a conventional optical disk for which the land/groove recording method is used.
Figure 11B:
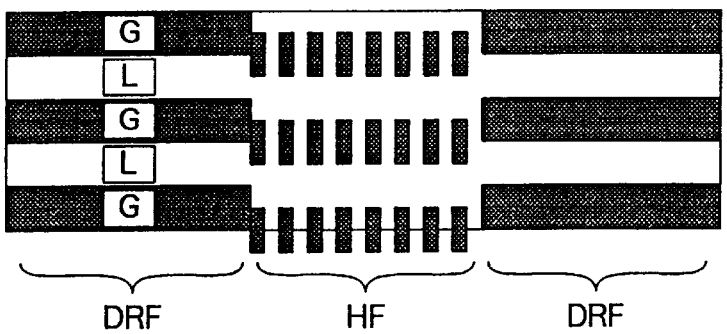
Figure 11C:
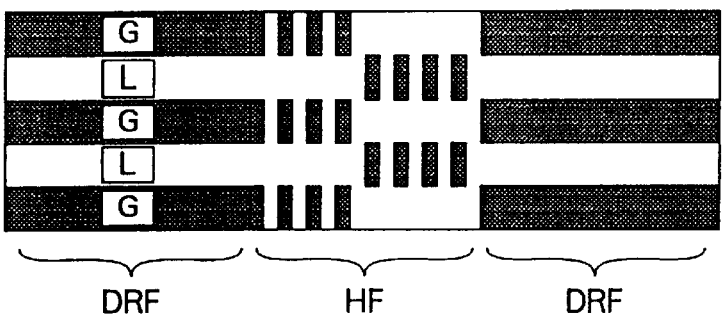
Figure 12:
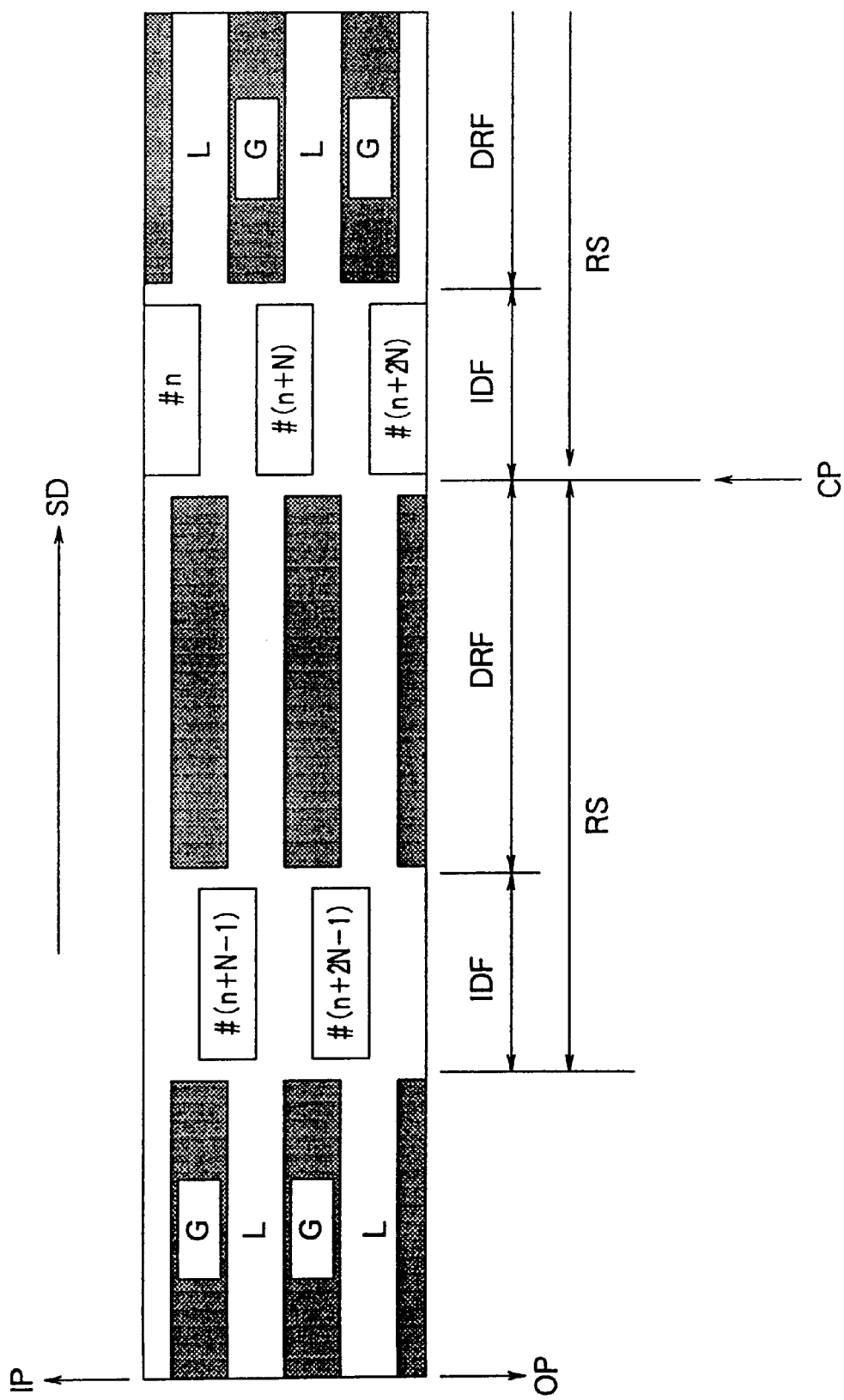
FIG. 12 schematically shows the arrangement of identification signal prepits in data recording sectors and the address values of the sectors immediately before and after a boundary line between the land tracks and the groove tracks of a conventional optical disk.
Figure 13:
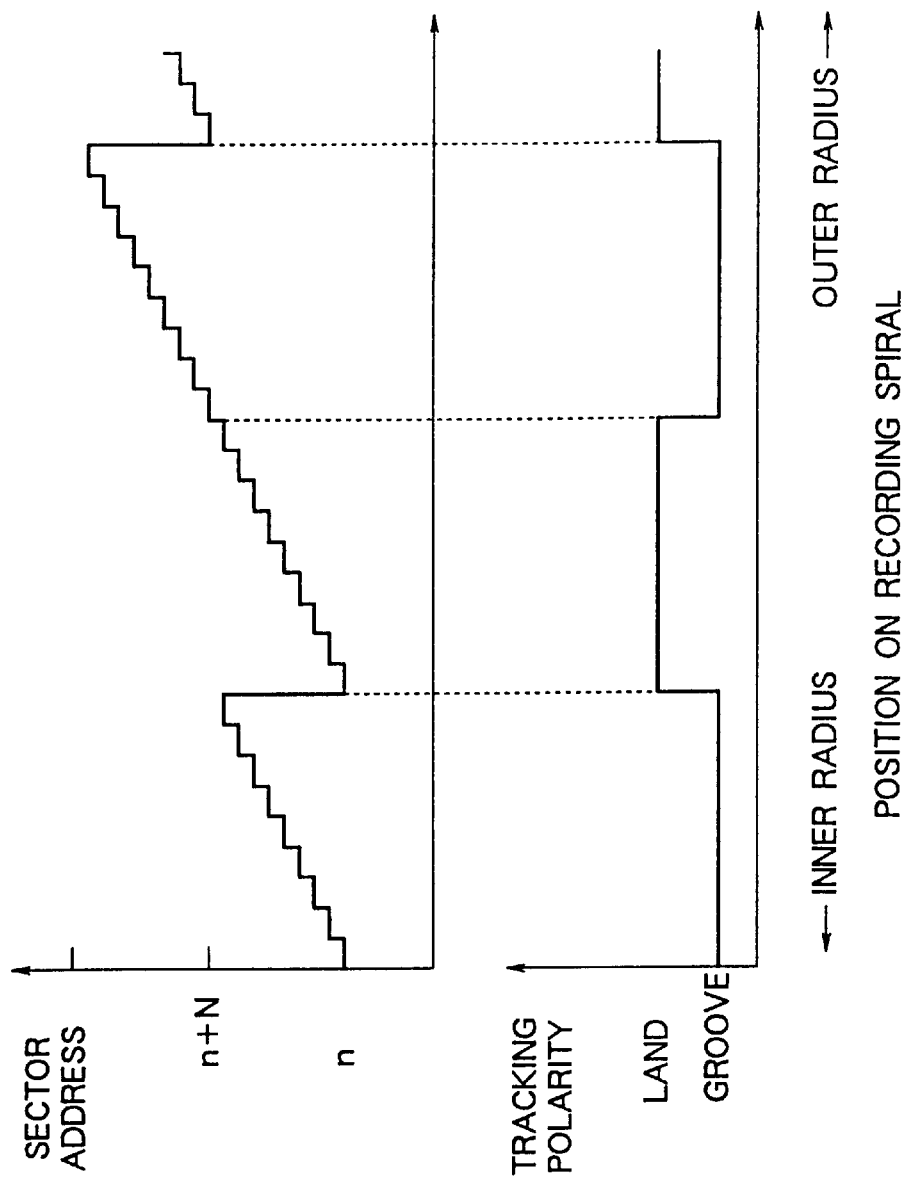
FIG. 13 shows the relationship between the position of the track sectors in the data recording spiral of a conventional optical disk and the addresses of the track sectors.

As shown in FIG. 2, when the address of a sector (a groove track sector in this figure) is set to #n (n is an integer) and the number of sectors in one track is set to N (N is an integer greater than zero), the address of a sector after a revolution of the track is #(n+N). Similarly, the address of a sector after a further revolution of the track is #(n+2N), and the address of a sector after a further revolution of the track is #(n+3N), and so on. As in the case of the sectors other than those immediately before and after a connecting point, the address values change linearly, but the physical configurations of the sectors alternate between land track sectors and groove track sectors. With respect to the continuity of the addresses of the sectors immediately before and after a connecting point, the address of a land track sector is represented by an identification signal in the front region FR which is shifted by half a track pitch radially outwards from the center of a groove track, while the address of a groove track sector is represented by an identification signal in the rear region RR which is shifted by half a track pitch radially inwards from the center of a groove track. FIG. 3 shows the relationship between the position of the track sectors in the data recording spiral of an optical disk and the addresses of the track sectors according to the first embodiment of the present invention. It can be seen from the figure that a one-to-one correspondence is established between the position of a sector in the data recording spiral and the address of the sector, regardless of the tracking polarity of the sector, or without distinction between land and groove tracks. In a conventional optical disk for which the land/groove recording method is used, two data recording regions of a land and a groove are present for a single physical address of a sector. An optical disk drive apparatus for driving the above-mentioned optical disk is now described. FIG. 4 is a block diagram showing a structure of an optical disk drive apparatus according to the first embodiment of the present invention. Referring to FIG. 4, an optical disk drive apparatus according to this embodiment is shown schematically for use with the optical disk 100. The optical disk drive apparatus according to this embodiment includes an address extracting circuit 1, a system controller 2, the semiconductor laser 101, the collimator lens 102, the half mirror 103, the object focusing lens 104, the photodetector 105, the actuator 106, the optical head 107, the differential amplifier 108, the tracking polarity reversal circuit 109, the tracking controller 110, the summing amplifier 111, the waveform shaping circuit 112, the reproduced signal processor 113, the address reproduction circuit 114, the traverse motor controller 116, the traverse motor 117, the recording signal processor 118, the laser diode (LD) driving circuit 119, and the driving circuit 120. Basically, the above-mentioned structural elements are generally identical to those of the conventional optical disk drive apparatus illustrated in FIG. 9. Thus, like reference numerals are assigned to these structural elements, and their description is omitted. The structural elements which are different from those of the conventional optical disk drive apparatus illustrated in FIG. 9 are described. The address extracting circuit 1 receives a digital signal from the waveform shaping circuit 112, a tracking error signal from the differential amplifier 108, and the control signal T1 from the system controller 2. Then, the address extracting circuit 1 supplies an address signal to the address reproduction circuit 114. The system controller 2 supplies the control signal T1 to the address extracting circuit 1 and the tracking polarity reversal circuit 109. The system controller 2 supplies the control signal T2 to the tracking controller 110 and supplies the control signal T3 to the traverse motor controller 116. The system controller 2 also supplies the control signal T4 to the LD driving circuit 119 and the recording signal processor 118. Then, the system controller 2 receives the address signal from the address reproduction circuit 114.

An operation of the optical disk drive apparatus according to the first embodiment having the above-mentioned structure is described in conjunction with the address recognition. It is assumed herein that a beam spot is scanning a groove track. Then, the system controller 2 supplies an L-level signal indicative of the groove track to the address extracting circuit 1 as the control signal T1 representing the tracking polarity. In response to the control signal T1, the address extracting circuit 1 recognizes that the signal produced from the rear region RR of the identification signal part IDF of the groove sector represents the address of the groove sector being scanned. Since the rear region RR of the identification signal part of the track sector is shifted by half a track pitch radially inwards (IP) from the groove track center, the tracking error signal indicates that the beam spot greatly deviates from the groove track center radially outwards. This also makes it possible to recognize that the identification signal prepits having been read are the ones for a groove sector. Now, it is assumed that a beam spot is scanning a land track. Then, the system controller 2 supplies an H-level signal indicative of the land track to the address extracting circuit 1 as the control signal T1 representing the tracking polarity. In response to the control signal T1, the address extracting circuit 1 recognizes that the signal produced from the front region FR of the identification signal part IDF of the land sector represents the address of the data recording part of the land sector. Since the front region FR of the identification signal part of the land sector is shifted by half a track pitch radially inwards (IP) from the land track center, which is equivalent to that the front region FR of the identification signal part of the land sector is shifted by half a track pitch radially outwards from the grove track center, the tracking error signal indicates that the beam spot greatly deviates radially outwards from the land track center. This also makes it possible to recognize that the identification signal prepits are the ones for a land sector. The address data from the address extracting circuit 1 corresponds to a physical sector address in a one-to-one relationship. Thus, the readout address data can determine the address of a data recording sector unequivocally. As described above, in this embodiment, the two address data regions are provided in an identification signal part, one for a groove track sector and the other for a land track sector adjacent thereto. The first address data region is shifted from the center of a groove track by a predetermined distance in one of the radial direction of the disk. On the other hand, the second address data region is shifted from the center of the groove track by the same predetermined distance in the other radial direction of the disk. Then, the address of the groove track sector is represented by an identification signal produced from the first address data region, and the address of the land track sector adjacent to the above-mentioned groove sector is represented by an identification signal produced from the second address data region. With this arrangement, a one-to-one relationship can be established between a sector and the address of the sector, without distinction between land and groove tracks. Thus, the problem due to the sharing of the same address, such as, for example, k (k is an integer) by a groove track sector and a land track sector adjacent thereto can be solved, and a unique address can be assigned to each sector, without distinction between land and groove tracks. Further, by setting the addresses of sectors to be monotonously increasing or monotonously decreasing, or continuously increasing or continuously decreasing, with respect to the arrangement of the sectors in the data recording spiral without distinction between land and groove tracks, the sector address calculation is greatly facilitated, and control programs and an access control circuit for an optical drive apparatus thus can be simplified. As an additional function of the optical disk apparatus according to this embodiment, a track offset correction is next described. In a sample servo method, for example, a pair of pit sequences for detection of a track offset are formed on a track, being respectively shifted in opposite directions by a predetermined distance from the center of the track, so that the amount of a tracking offset can be detected. If a laser beam passes through the mid-point between the pair of offset detection pit sequences or the center of the track, the amplitudes of reproduced signals from the pair of offset detection pit sequences will be identical. If a laser beam has deviated from the center of the track in one direction, the amplitude of a signal reproduced from one of the offset detection pit sequences will increase, and the amplitude of a signal reproduced from the other of the offset detection pit sequences will decrease. Accordingly, by using this amplitude variation, the amount of a track offset of a laser beam can be detected, and correction can be applied. The laser beam thus can be controlled to follow the center of the track. The same principle and effect can be applied to an SS-L/G format optical disk according to this embodiment. Let us assume now that a laser beam passes through a specific groove track sector and enters a next groove track sector. Since the front region of the identification signal part of the groove track sector is shifted by half a track pitch radially outwards, a corresponding tracking error signal is produced. When the laser beam passes through the rear region which is shifted by half a track pitch radially inwards, a corresponding tracking error signal is produced. If two symmetrical tracking error signals which have the same magnitude and different polarity are detected, it means that the laser beam is scanning the center of the track. For this reason, by using the repetition of identification signals offset in opposite directions, a tracking servo system can operate in such a manner that the laser beam will scan the center of the track. In the above description, the address of a land track sector is represented by the front region FR of the identification signal part IDF, whereas the address of a groove track sector is represented the rear part RR of the identification signal part IDF. The assignment of the sector addresses may alternatively be such that the address of a groove track sector is represented by the front part FR of the identification signal part IDF, and the address of a land track sector is represented by the rear region RR of the identification signal part IDF. With such a modification, the features and merits identical to those explained above are still obtained.

In the above description, the front region FR is deviated radially outwards by half a track pitch from the center of a groove track, and the rear region RR is deviated radially inwards by half a track pitch from the center of a groove track. The direction of the deviation may alternatively such that the front region FR is shifted by half a track pitch radially inwards from the center of a groove track and the rear region is RR is shifted by half a track pitch radially outwards from the center of a groove track. With such a modification, the the features and merits identical to those explained above are still obtained.

Second Embodiment

Figure 5:
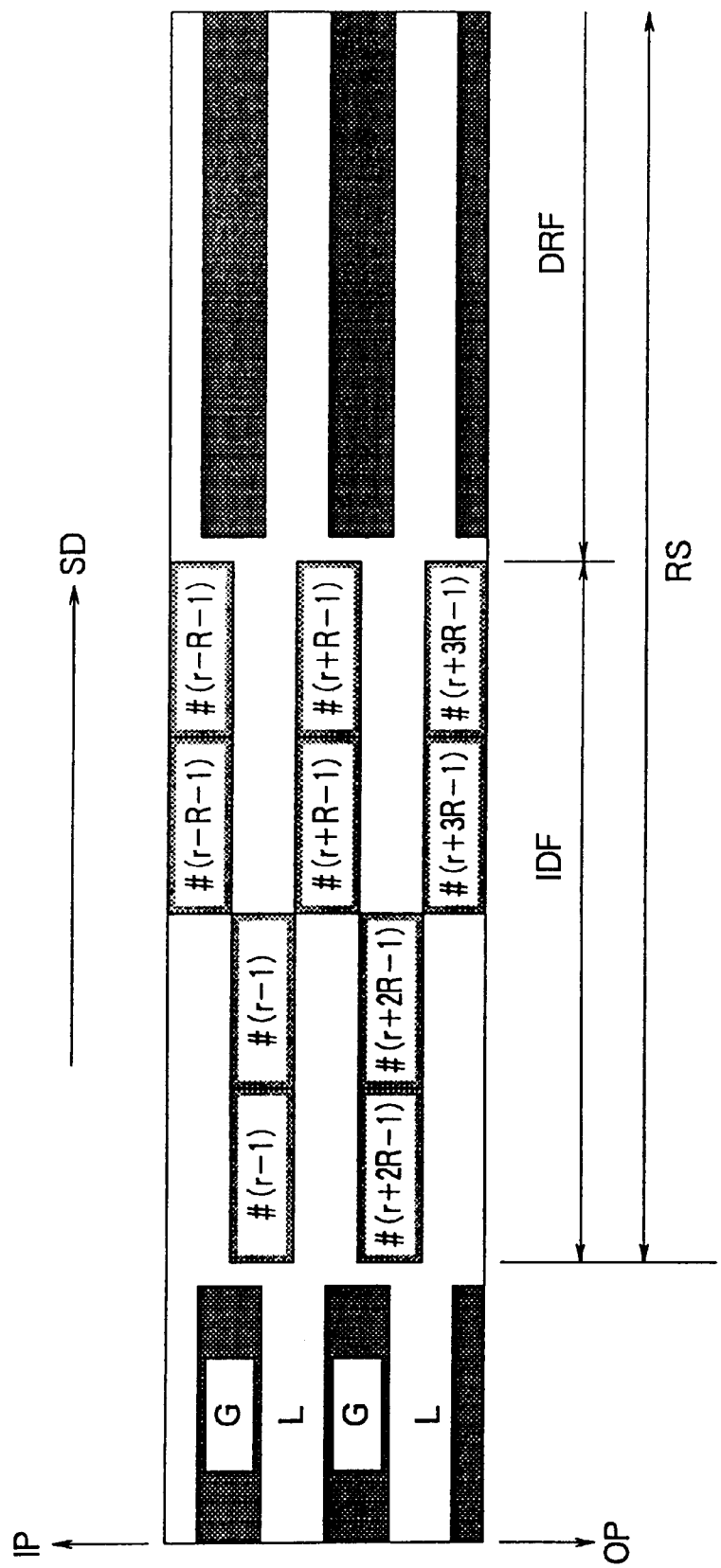
FIG. 5 schematically shows the arrangement of identification signal prepits in data recording sectors on an optical disk according to the second embodiment of the present invention and the address values of the data recording sectors.

An optical disk according to the second embodiment is now described. FIG. 5 schematically shows the arrangement of identification signal prepits in data recording sectors on an optical disk and the address values of the data recording sectors according to the second embodiment of the present invention. This embodiment is characterized by the multiple recording of address data onto a sector. As shown in FIG. 5, two identical address data are recorded in each of the front region FR and the rear region RR of the identification signal part IDF. As in the first embodiment, the front region FR of the identification signal part is shifted by half a track pitch radially outwards, and the rear region RR of the identification signal part is shifted by half a track pitch radially inwards from the center of a groove track. In the above-illustrated embodiment, two identical address data are recorded in a sector. However, the three or more identical address data may alternatively be recorded in a sector.

Figure 6:
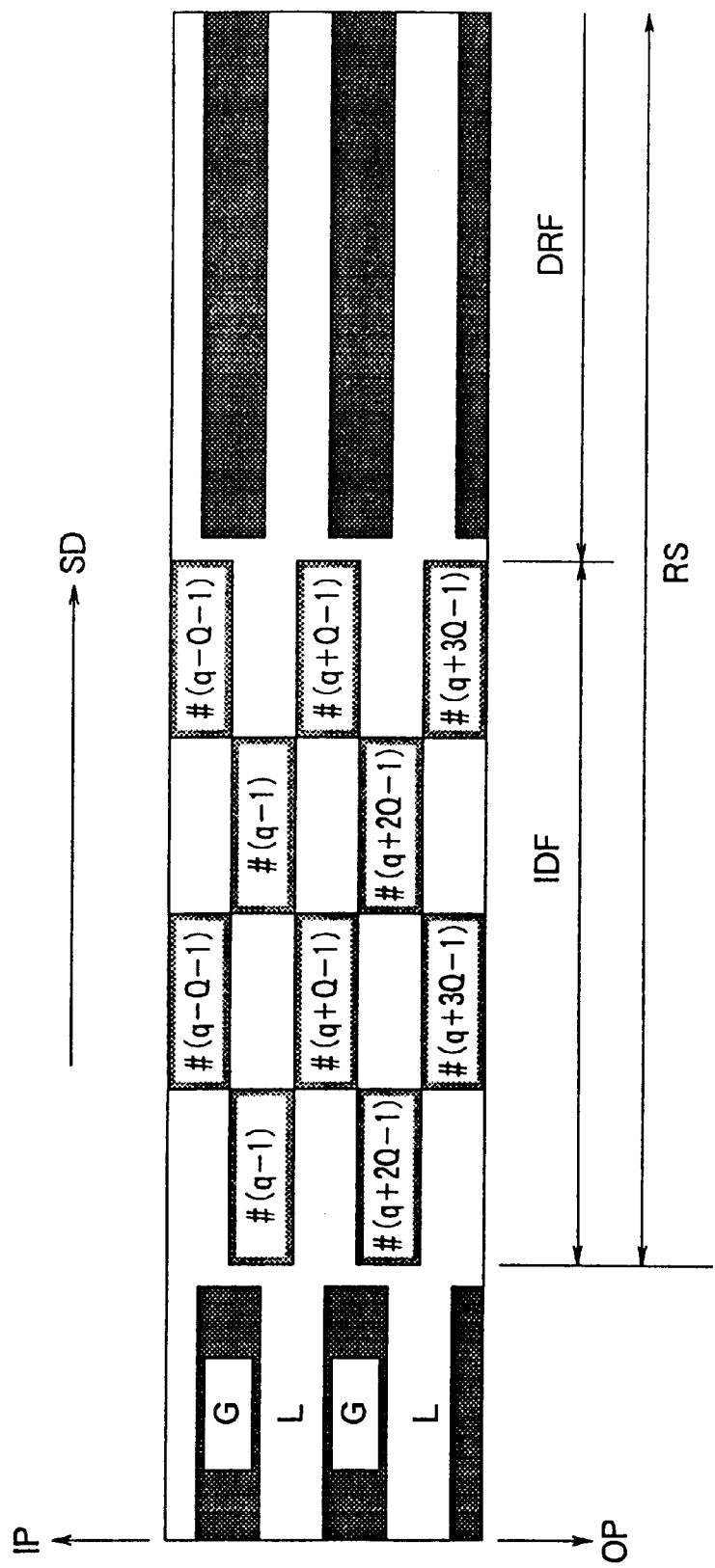
FIG. 6 schematically shows the arrangement of identification signal prepits in data recording sectors on an optical disk according to the third embodiment of the present invention and the address values of the data recording sectors.

With this multiple recording and the arrangement of address data in a sector, an error rate in reading address data in the identification signal can be reduced. Third Embodiment An optical disk according to the third embodiment is described. FIG. 6 schematically shows the arrangement of identification signal prepits in data recording sectors on an optical disk and the address values of the data recording sectors according to the third embodiment of the present invention. This embodiment is also characterized by the multiple recording of address data onto a sector. As shown in FIG. 6, the identification signal part of this embodiment is divided into a first section and a second section, the first section in front and the second section at the back with respect to the direction of scanning. The first section comprises a front region and a rear region. Similarly, the second section comprises a front region and a rear region. The addresses recorded in the front regions in the first and second sections are identical. The addresses recorded in the rear regions in the first and second sections are identical. In this way, the addresses of the groove and land track sectors are duplicated. In the illustrated embodiment, two identical address data are recorded in a sector. However, three or more identical address data may alternatively be recorded in a sector.

Figure 7:
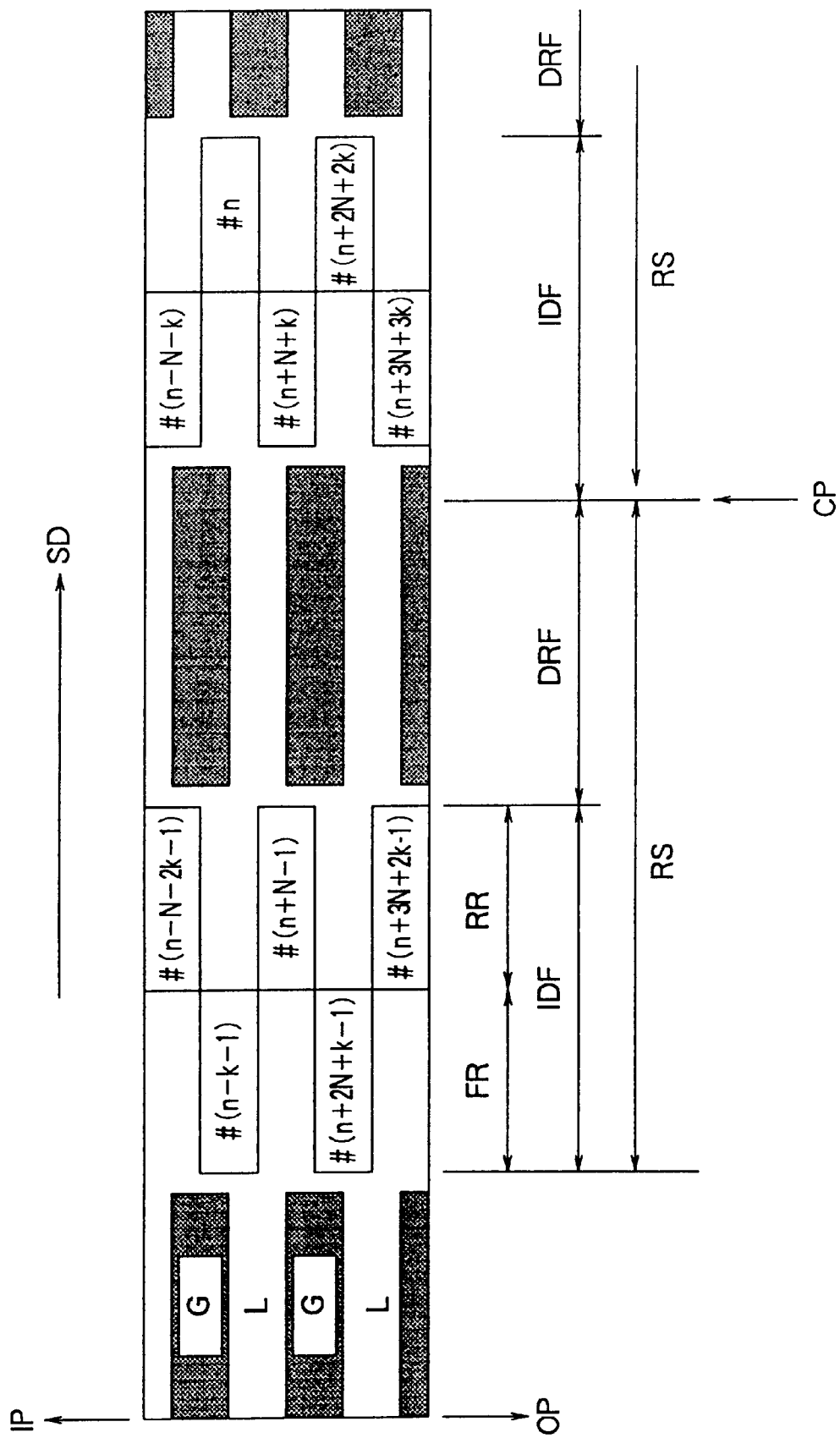
FIG. 7 schematically shows the arrangement of identification signal prepits in data recording sectors on an optical disk according to the fourth embodiment of the present invention and the address values of the data recording sectors.
Figure 8:
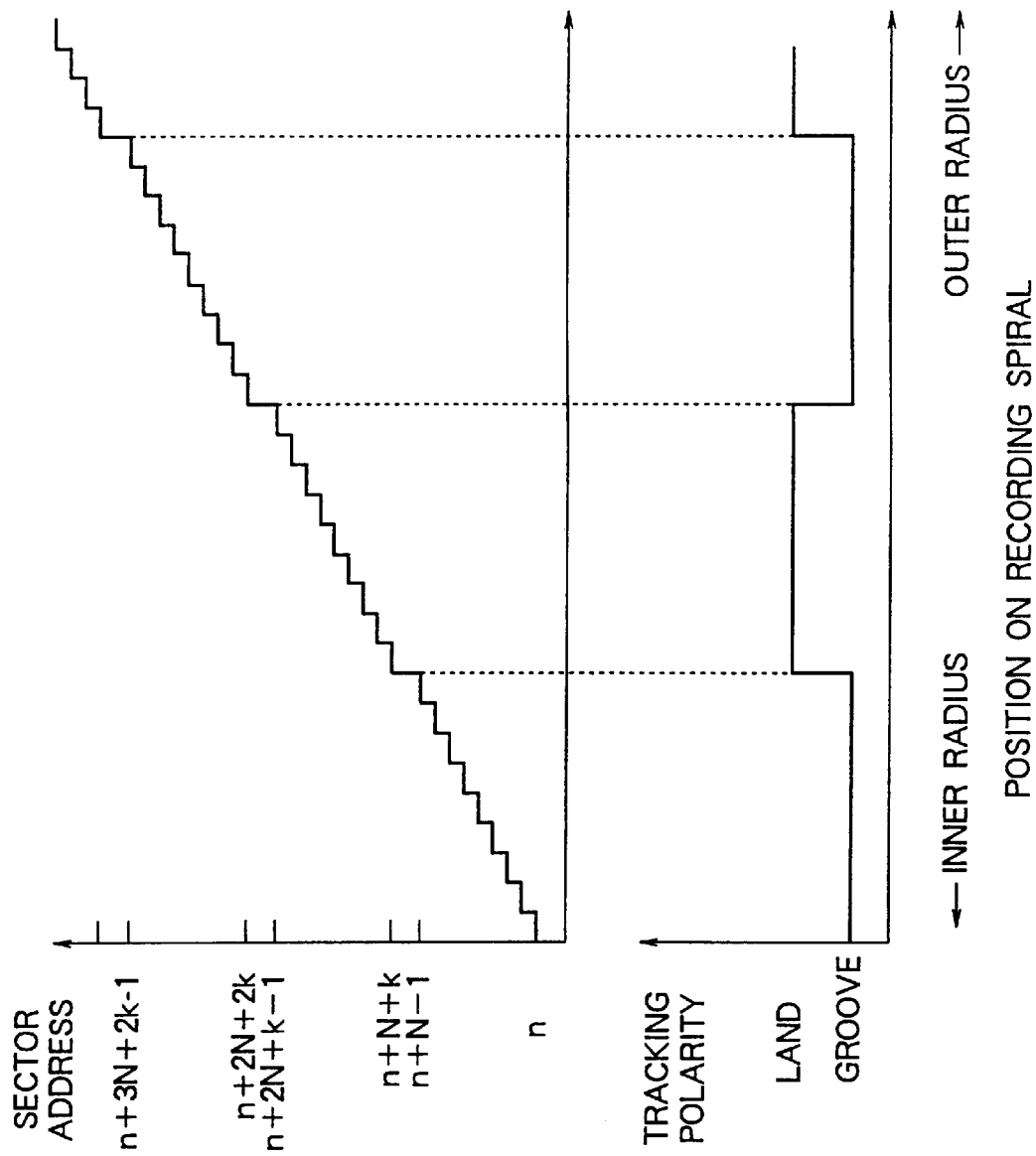
FIG. 8 shows the relationship between the position of the track sectors in the data recording spiral of an optical disk according to the fourth embodiment of the present invention.

With this multiple recording and the arrangement of address data in a sector, an error rate in reading address data in the identification signal can be reduced. This embodiment is different from the second embodiment in that the address of a groove track sector and the address of a land track sector are alternately recorded in multiple locations in a sector. Thus, the reliability of address data is enhanced. However, each address region must start with prepits for synchronization. Accordingly, the format overhead is large. As an additional function or effect, the same principle and effect which have been used for an optical disk to which the sample servo method is applied can also be used for an SS-L/G format optical disk according to this embodiment. In this case, by recording a plurality of the first address data and the second address data alternately in the identification signal part IDF of a sector, a tracking error can be detected over an extended time period, and a tracking accuracy can be enhanced. In this way, identification signals can be used to implement the tracking offset correction by the servo system more easily and accurately. Fourth Embodiment In the first embodiment, when a data recording track includes N data recording sectors, the address of a sector after one revolution of a track is set to increase by N. The sector address calculation is simple as long as the addresses of the sectors increase or decrease monotonously along the data recording spiral. The addressing of data recording sectors as shown in FIG. 7 may be preferred if use of skipping sector addresses facilitates designing of a sector address access system. FIG. 8 shows the relationship between the positions of sectors in a data recording spiral and the addresses of the sectors.

In this embodiment, the address of a sector after one revolution of a track is set to increase by (N+k). After two revolutions of a track, the address of a sector will increase by (2N+2k). Now, let us assume that (N+k) is set to be a predetermined value which is greater than the number of sectors constituting a data recording track in the outermost zone. In this situation, even if the number N of sectors in one data recording track varies from one zone to another, the difference between the address values of track sectors which are adjacent to each other in the radial direction of the disk can always be set to be constant by changing the value of k. A beam spot always reads both of the address data for adjacent track sectors regardless of whether it is scanning a groove track or a land track. Thus, with this arrangement, if the address data of a sector scanned by a beam spot cannot be read because of a reading error or the like, the address of the sector adjacent thereto can be referred to and the address data of the sector can be obtained. Further, by reading both of the addresses for adjacent sectors constantly, redundancy of the address information can be increased.

In an optical disk having the ZCAV format or the ZCLV format, the number of data recording sectors per track varies from one zone to another. When the number of sectors per track varies from one zone to another, the address management of the connecting points between land tracks and groove tracks will be complex. If the address setting method described in this embodiment is applied to an optical disk having the above-mentioned format, the address management of the connecting points can be simplified.

Even with this arrangement, a one-to-one correspondence is established between the the physical position of a sector and the address thereof, without distinction between land and groove tracks. Accordingly, the same sector address will not be shared by a groove track sector and a land track sector adjacent thereto, as opposed to the prior art. The sector addresses can be determined unequivocally.

While particular embodiments of the invention have been shown and described, it will be obvious to those skilled in the art that changes and modifications may be made without departing from the invention in its broader aspects. The appended claims are therefore intended to cover all such changes and modifications as fall within the true spirit and scope of the invention. The matter set forth in the foregoing description and accompanying drawings is offered by way of illustration only and not as a limitation on the scope of the invention. The actual scope of the invention is intended to be defined in the following claims.

What is claimed is:

1. A method of producing a mother stamper for optical disks on which a single recording spiral is formed by alternately connecting, every revolution, groove tracks and land tracks, each revolution of the recording spiral being divided into a plurality of recording sectors; and identification signals representing the address of each recording sector is formed as prepits at the head of the recording sector; said method comprising:

forming a first address information part which is a part of the identification signal, such that it is shifted by a predetermined amount in one radial direction from the center of the groove track, forming a second address information part which is another part of the identification signal, such that it is shifted by said predetermined amount in the other radial direction from the center of the groove track, and the prepits of said first address information part representing the address of a recording sector in the groove track, while the prepits of said second address information part representing the address of a recording sector in the land track adjacent to the groove track, and assigning the addresses to said first and second address information parts such that the addresses are increased or decreased monotonically in the order in which the recording sectors are arranged along the recording spiral, regardless of whether the recording sectors are on the groove track or on the land track.

2. The method as set forth in claim 1, wherein the prepits of the first address information parts and the second information parts are formed simultaneously with the formation of the groove tracks.

3. The method as set forth in claim 1, wherein the prepits of the first address information parts are formed when the groove tracks are formed, and the prepits of the second address parts are formed when the land tracks are formed.

4. The method as set forth in claim 1, wherein the land tracks and the prepits are formed using a single beam.

5. The method as set forth in claim 1, wherein the prepits representing the address of the recording sector on the groove track are repeatedly formed in the first address information part, and prepits representing the address of the recording sector on the land track are repeatedly formed in the second address information part.

6. The method of claim 1 wherein method includes using said mother stamper in a process of making optical disks.

7. An optical disk made by the method of claim 6.

* * * * *